United States Patent
Banerjea

(10) Patent No.: US 8,014,804 B2
(45) Date of Patent: Sep. 6, 2011

(54) ASSOCIATING A WIRELESS STATION WITH AN ACCESS POINT

(75) Inventor: Raja Banerjea, Sunnyvale, CA (US)

(73) Assignee: Agere Systems Inc., Allentown, PA (US)

( * ) Notice: Subject to any disclaimer, the term of this patent is extended or adjusted under 35 U.S.C. 154(b) by 2267 days.

(21) Appl. No.: 10/838,868

(22) Filed: May 4, 2004
(Under 37 CFR 1.47)

(65) Prior Publication Data

US 2006/0135066 A1 Jun. 22, 2006

(51) Int. Cl.
*H04B 7/00* (2006.01)

(52) U.S. Cl. ..... 455/513; 455/507; 455/434; 455/435.2; 455/437; 455/452.1; 455/452.2; 455/67.11; 455/67.13; 370/328; 370/331; 370/332; 370/445; 370/447; 709/220; 709/221; 709/224; 709/225

(58) Field of Classification Search .................. 455/434, 455/445, 454, 464, 414.1–4, 428, 507–513, 455/435.1–435.2, 436–438, 452.1–452.2, 455/453, 57.11, 67.13; 370/310, 328–333, 370/468, 464–465, 445, 447, 448; 709/220–221, 709/223–226
See application file for complete search history.

(56) References Cited

U.S. PATENT DOCUMENTS

| | | | | |
|---|---|---|---|---|
| 5,987,062 | A * | 11/1999 | Engwer et al. | 375/225 |
| 6,438,363 | B1 * | 8/2002 | Feder et al. | 455/226.4 |
| 6,522,881 | B1 * | 2/2003 | Feder et al. | 455/437 |
| 6,580,700 | B1 * | 6/2003 | Pinard et al. | 370/332 |
| 7,016,696 | B2 * | 3/2006 | Vincent et al. | 455/515 |
| 7,079,850 | B2 * | 7/2006 | Cameron | 455/456.1 |
| 2007/0109980 | A1 * | 5/2007 | Awater et al. | 370/310 |

* cited by examiner

*Primary Examiner* — Tuan A Tran
(74) *Attorney, Agent, or Firm* — Mendelsohn, Drucker & Associates, P.C.; Kevin M. Drucker; Steve Mendelsohn

(57) ABSTRACT

A station associates with an access point in a wireless local area network conforming to, e.g., an IEEE 802.11 standard. The station measures the signal-to-noise ratio (SNR) for the downlink from each of the access points sending either a beacon or a probe response, and forms a first list of access points in decreasing order of received downlink SNR. The station transmits a link test request to each access point to query the access point for the SNR of the link test request received at the corresponding access point. Access points respond to the link test request with corresponding link test responses containing the corresponding SNR. The station i) forms a second list of access points in decreasing order of received uplink SNR and ii) compares the first and second lists to determine which access point to associate with based on overall quality of the uplink and downlink channels.

18 Claims, 2 Drawing Sheets

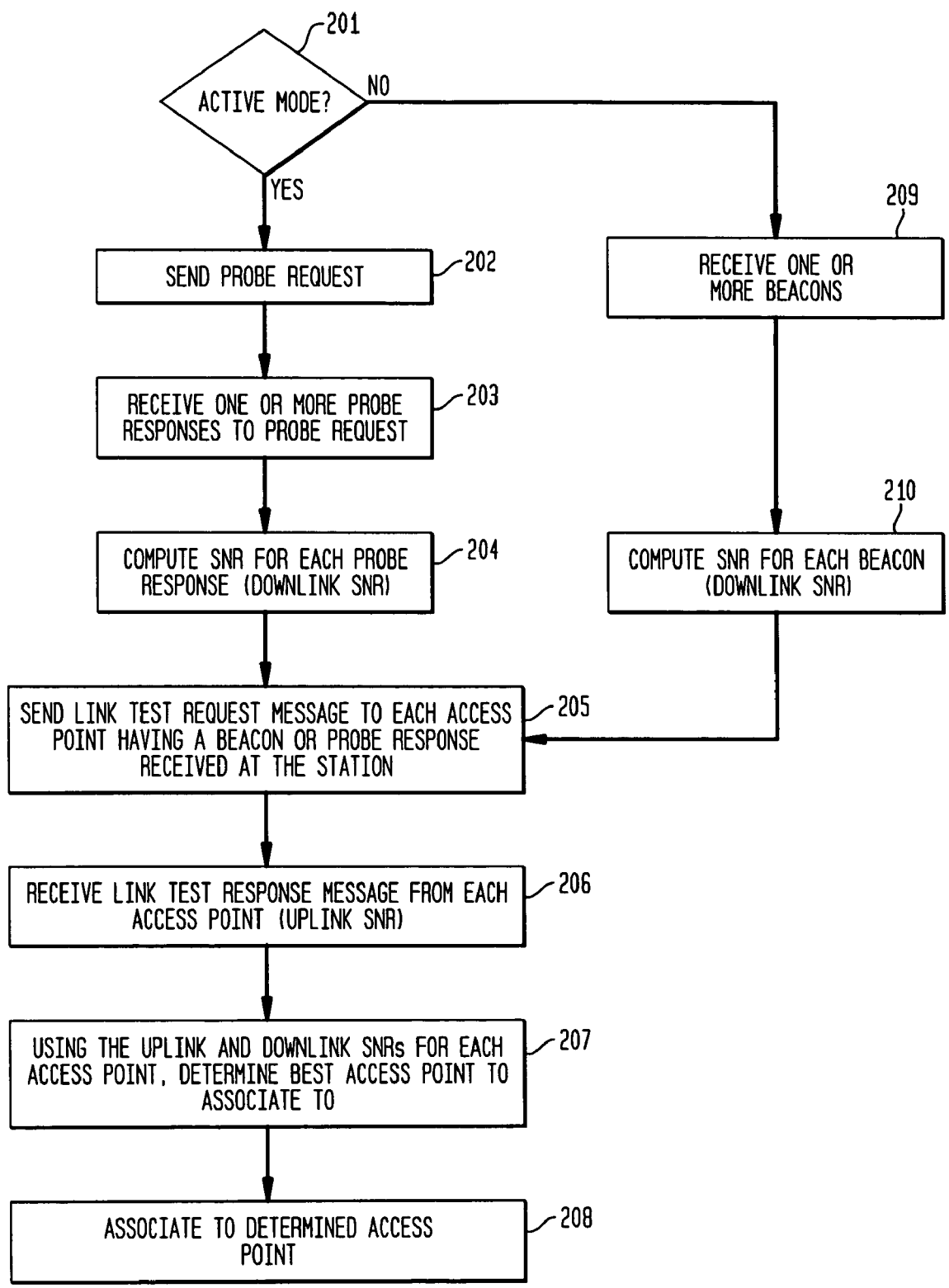

ASSOCIATING A WIRELESS STATION WITH AN ACCESS POINT

BACKGROUND OF THE INVENTION

1. Field of the Invention

The present invention relates to communication networks, and, more particularly, to associating a station with an access point in a wireless local area networks.

2. Description of the Related Art

Wireless local area networks (WLANs) include one or more non-fixed stations (or mobile terminals) such as cell phones, notebook (laptop) computers, and hand-held computers, equipped with generally available, WLAN PC cards that enable communication among themselves as well as through a network server. An example of a WLAN network is a network that conforms to standards developed and proposed by the Institute of Electrical and Electronic Engineers (IEEE) 802.11 Committee (i.e., a network operating in accordance with one or more editions of the IEEE 802.11 standard for telecommunications and information exchange between systems).

In WLANs operating in accordance with the IEEE 802.11 standard, a network server provides support for communication between stations in different service sets (SSs), which are associated with different access points (APs). An AP is a terminal or other device that provides connectivity to other networks or service areas, and also, in some cases, coordinates communication directly between stations. An AP may be either fixed or mobile, but for most applications is fixed. Such WLAN networks allow stations to be moved within a particular service area without regard to the connections among the stations within that service area.

Most networks are organized as a series of layers, each one built upon its predecessor. The purpose of each layer is to offer services to the higher layers, shielding those layers from implementations details of lower layers. Between each pair of adjacent layers is an interface that defines those services. The International Standards Organization has developed a layered-network architecture called the Open Systems Interconnection (OSI) Reference model that has seven protocol layers: application, presentation, session, transport, network, data link, and physical. The function of the lowest level, the physical layer, is to transfer bits over a communication medium. The function of the data link layer is to partition input data into data frames and transmit the frames over the physical layer sequentially. Each data frame includes a header that contains control and sequence information for the frames.

The interface between the data link layer and the physical layer includes a medium access control (MAC) device and a physical layer signaling control device, called a PHY device. The purpose of the MAC device and the PHY device is to ensure two network stations are communicating with the correct frame format and protocol. In a WLAN, a radio is the physical device, and free space is the physical communications medium. The IEEE 802.11 standard for WLANs defines the communication protocol between the MAC device and the PHY device. For the WLAN data communication protocol, each data frame transferred between the MAC and the PHY devices has a PHY header, a MAC header, MAC data, and error checking fields. The PHY header includes a preamble that is used to indicate the presence of a signal, unique words, frame length, etc. The MAC header includes frame control, duration, source (i.e., MAC) and destination address, and data sequence number.

Typically, messages transmitted among the stations associated with the same AP (termed an extended service set, or ESS) in such WLAN networks are transmitted to the access point (AP) rather than being directly transmitted between the stations. Such centralized wireless communication provides significant advantages in terms of simplicity of the communication link as well as in power savings. One primary operation of the WLAN is the process by which a station associates (establishes a communication connection) with an AP. When a station associates with an AP, a basic service set (BSS) is formed. Association is typically initiated by the station, and may occur in either an active mode or a passive mode. In passive mode, the station listens for periodic control messages, called beacons, sent by an AP that indicate the service set identification (SSID) of the AP. In active mode, the station sends a probe request, and each AP receiving the probe request transmits a probe response to the station with its SSID.

In the IEEE 802.11 standard, the station has signal quality information pertaining only to the link from the AP to the station. This signal quality information, such as received power or signal-to-noise ratio (SNR), is measured by the station. The station then associates to the AP based on the strongest received power level. The station associates to the AP using one or more control messages to, and with appropriate acknowledgment messages from, the AP.

SUMMARY OF THE INVENTION

The present invention relates to association of a station association with an access point in a wireless local area network conforming to, e.g., an IEEE 802.11 standard. The station measures link quality, such as the signal-to-noise ratio (SNR), for the downlink channel from each of the access points sending a message, and forms a first list of the access points in decreasing order of received downlink channel SNR. The station transmits a link test request to each access point to query the access point for the link quality (e.g., SNR) of the link test request received at the corresponding access point. Access points respond to the link test request with corresponding link test responses containing the corresponding uplink SNR. The station i) forms a second list of the access points in decreasing order of received uplink SNR and ii) compares the first and second lists to determine which access point to associate with based on overall quality of the uplink and downlink channels.

In accordance with exemplary embodiments of the present invention, a station is associated to one of a plurality of access points in a wireless local area network (WLAN) by: (a) measuring a downlink signal quality of a message received in a signal from each of one or more access points; (b) transmitting a test link request to each of the one or more access points; (c) receiving a corresponding test link response for one or more of the test link requests, the test link response including an uplink signal quality to the corresponding access point; (d) comparing the corresponding uplink and downlink signal qualities of the one or more access points; and (e) selecting the one of the plurality of access points based on the comparison.

BRIEF DESCRIPTION OF THE DRAWINGS

Other aspects, features, and advantages of the present invention will become more fully apparent from the following detailed description, the appended claims, and the accompanying drawings in which:

FIG. 2 shows a method of station association in accordance with an exemplary embodiment of the present invention.

DETAILED DESCRIPTION

Figure 1:
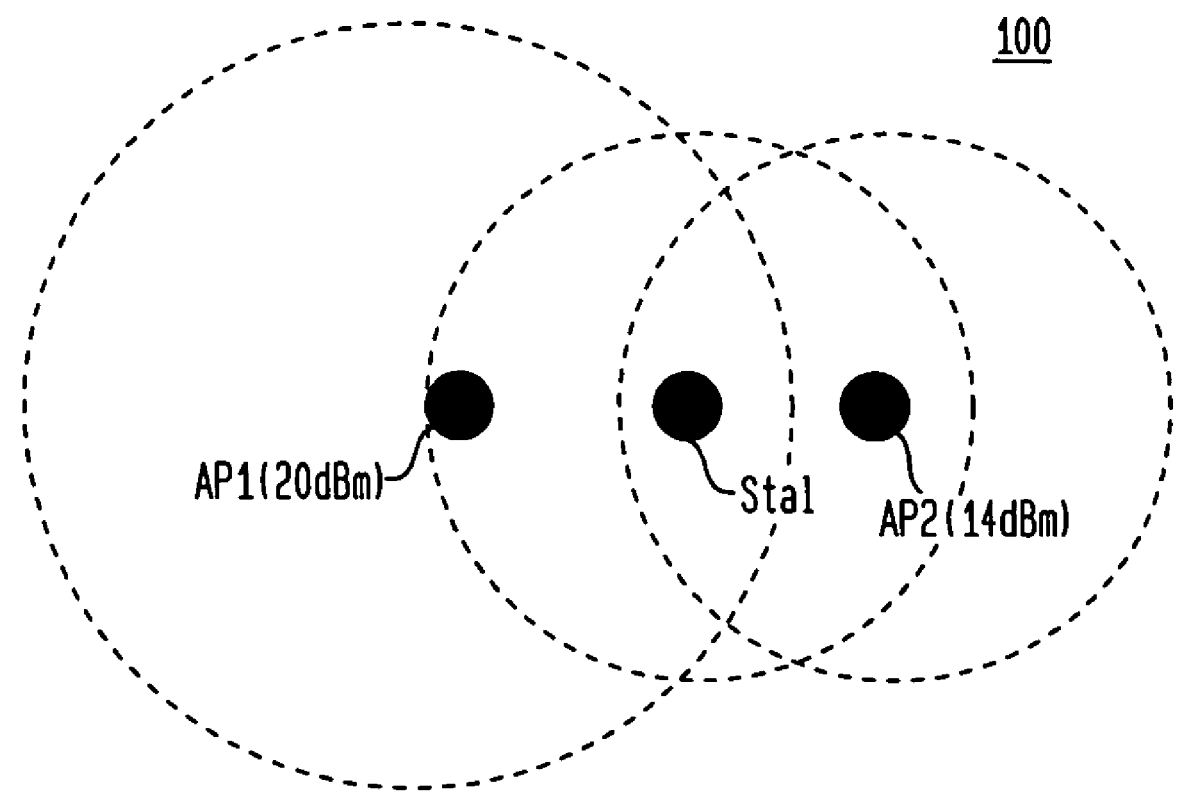
FIG. 1 shows a wireless local area network employing station association in accordance with an exemplary embodiment of the present invention.

FIG. 1 shows a wireless local area network (WLAN) 100 employing station association in accordance with an exemplary embodiment of the present invention. WLAN 100 is a network operating in accordance with, for example, one or more versions (or editions) of the IEEE 802.11 standard. Station STA1 desires to form a basic service set (BSS) with one of first and second access points AP1 and AP2. A BSS is a connection for the transfer of data between station STA1 and another device (not necessarily shown in FIG. 1) through the associated one of the access points AP1 and AP2. STA1 might be a wireless client or mobile terminal, such as a cell phone, hand-held computer, or notebook (laptop) computer. Access points AP1 and AP2 are typically fixed receivers, such as fixed radio receiver sets. For convenience, messages sent from the access point to the station are transmitted in a channel termed a "downlink channel," and messages sent from the station to the access point are transmitted in a channel termed an "uplink channel."

In accordance with embodiments of the present invention, station association employs a measured signal level in each of the uplink and downlink channels to determine which access point a station should associate with when forming a BSS. Each access point communicates with an average transmit level, which is shown in FIG. 1 for AP1 as the dashed circle with 20 dBm power and for AP2 as the dashed circle with 14 dBm power. Because of the greater transmit power of AP1, the coverage area of AP1 is bigger than AP2. Other factors may contribute to one access point having a greater coverage area than another access point, such as atmospheric conditions, buildings or other objects in the coverage area, or high background noise conditions.

Association in WLAN 100 is typically initiated by station STA1, and may occur in either an active mode or a passive mode. In passive mode, STA1 listens for periodic control messages, called beacons, in a downlink channel sent by access points AP1 and AP2 that indicate the service set identification (SSID) of the corresponding access point. In active mode, STA1 sends a probe request in an uplink channel, and each of the access points AP1 and AP2 receiving the probe request transmits a probe response to the station with its SSID.

When wireless station STA1 initiates association in passive mode, STA1 receives beacons from both AP1 and AP2. When wireless station STA1 initiates association in active mode, STA1 receives beacons and probe responses from both AP1 and AP2. The SNR of the signal (e.g., either a beacon or a probe response) received from AP1 is better than that received from AP2 because of, for example, the greater transmit power of AP1 and the position of STA1 in relation to AP1 and AP2. Because of, for example, limited power available to STA1 for transmission, AP2 receives the signal (of, e.g. the probe request) from STA1 "better" than AP1 because STA1 is "closer" to AP2. To one skilled in the art, "better" may be a given metric, such as signal-to-noise ratio (SNR), bit-error rate (BER), or burst error rate, and "closer" might not be in terms of physical distance, but in terms of the metric (SNR or BER) for the signal transmitted by the station or access point.

In general, each access point will transmit with greater power than the station transmits. Consequently, if the station associates with the access point having the higher transmit power (AP1), the station may have to transmit with much higher power to this access point. When the station receives a first access point signal better than a second access point signal, but the second access point receives the station's signal better than the first access point's signal, it might be preferable for STA1 to associate with AP2 when forming the BSS rather than associate to AP1.

In accordance with the present invention, the station measures the SNR of each access point's signal received by the station, and also queries each access point for the SNR of the station's signal that the access point receives. The query message sent by the station to an access point may be termed a link test request message. The response of the access point to the query message may be termed a link test response. Given the SNR information of both uplink and downlink channels, the station determines with which access point to associate. The station uses standard IEEE 802.11 association procedure messaging compliant with, for example, MAC and PHY layer control to implement the method of association in accordance with exemplary embodiments of the present invention.

FIG. 2 shows a method of station association in accordance with an exemplary embodiment of the present invention. At step 201, a test determines whether the station is in Active Mode. If the test of step 201 determines that the station is in active mode, then, at step 202, the station transmits one or more probe requests. At step 203, the station receives probe responses each with access point SSID. At step 204, the station computes the SNR of the signal for each received probe response, which is the downlink SNR for the corresponding access point. From step 204, the method advances to step 205. SNR might be measured by any one of a number of techniques known in the art, such as by measuring average noise power during periods when no signal is present and measuring average noise power when the signal with added noise is present.

If the test of step 201 determines that the station is not in active mode (e.g., in passive mode), then, at step 209, the station listens for one or more beacon messages with the SSID of each transmitting access point. At step 210, the station computes the SNR of the signal for each beacon (downlink SNR). From step 210, the method advances to step 205.

At step 205, the station sends a link test request message to each access point from which it received a valid SSID. The link test request message is a request to the access point to return to the station the SNR of the link test request message. At step 206, the station receive a link test response message from one or more of the access points to which a corresponding link test request message was sent. Each link test response message contains the SNR of the corresponding link test request message (the uplink SNR).

At step 207, the station then considers the uplink and downlink SNR values for each access point SSID as a measure of the overall bi-directional communication link quality. The station might form a list of all the access point SSIDs in decreasing order of downlink SNR values. After receiving the link test responses, the station might form a list of all the access point SSIDs in decreasing order of uplink SNR values. Based on a given evaluation criterion, at step 207, the station determines the "best" access point to associate with. Many types of evaluation criterion are known in the art. For example, the station might associate to the access point returning the highest uplink SNR whose downlink SNR is above a predetermined threshold.

At step 208, the station associates with the access point determined in step 207 that provides the best overall link quality.

In an alternative embodiment of the present invention, a station operating in active mode might omit the steps of 201 through 204 in FIG. 2, and simply initiate association by sending a link test request message at step 205. Each access point receiving the link test request message then returns a link test request response with the corresponding SSID and uplink SNR, and the station calculates the downlink SNR for each access point from the corresponding link test response message at step 206. The station then implements steps 207 and 208 to associate with the access point with the best overall link quality.

While the exemplary embodiment of the present invention is described for WLANs operating in accordance with one or more versions of the IEEE 802.11 standard, the present invention is not so limited. One skilled in the art may extent the teachings herein to other types of wireless local area communication networks.

The present invention may allow for the following advantages. A given implementation allows for an improved quality of IEEE 802.11 wireless connection in an environment where access points operate with different power levels (or other difference in signal quality), or in an environment where communication between access points and a station occurs with large differences in power levels between uplink and downlink channels. In addition, a given implementation may be compliant with current IEEE 802.11 standards, allowing for upgrade of existing systems.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A method of associating a station to one of a plurality of access points in a wireless local area network (WLAN), the method comprising the steps of:
   (a) measuring a downlink signal quality of a message received in a signal from each of one or more access points;
   (b) transmitting a test link request to each of the one or more access points;
   (c) receiving a corresponding test link response for each of one or more of the test link requests, the corresponding test link response including an uplink signal quality to the corresponding access point;
   (d) identifying at least one access point having a downlink signal quality above a predetermined threshold; and
   (e) associating to the access point, from among the at least one access point identified in step (d), having the highest uplink signal quality.

2. The invention as recited in claim 1, wherein the method further comprises the step of transmitting, when in an active mode, a probe request, and, for step (a), the message in the signal from each of the one or more access points is a probe response.

3. The invention as recited in claim 1, wherein the method further comprises the step of detecting, when in a passive mode, a beacon, and, for step (a), the message in the signal from each of the one or more access points is the beacon.

4. The invention as recited in claim 1, wherein, for step (a), each message conforms to a MAC layer frame format in accordance with one or more editions of an Institute of Electrical Engineers (IEEE) 802.11 standard for telecommunications and information exchange between systems.

5. The invention as recited in claim 4, wherein, for steps (b) and (c), each link test request and the corresponding link test response conform to the MAC layer frame format in accordance with one or more editions of the IEEE 802.11 standard.

6. The invention as recited in claim 1, wherein the uplink signal quality and the downlink signal quality are indicated by one or more of a signal-to-noise ratio (SNR), a bit-error rate (BER), a power level, and a burst error rate.

7. The invention as recited in claim 1, wherein the method is embodied as processing steps in a processor of an integrated circuit.

8. The invention as recited in claim 1, wherein the method is embodied as processing steps in a processor of a station operating in accordance with one or more editions of an Institute of Electrical Engineers (IEEE) 802.11 standard for telecommunications and information exchange between systems.

9. A method of associating a station to one of a plurality of access points in a wireless local area network (WLAN), the method comprising the steps of:
   (a) transmitting a test link request to each of one or more access points;
   (b) receiving a corresponding test link response for each of one or more of the test link requests, the corresponding test link response including an uplink signal quality to the corresponding access point;
   (c) measuring a downlink signal quality of the corresponding access point for each corresponding test link response;
   (e) identifying at least one access point having a downlink signal quality above a predetermined threshold; and
   (f) associating to the access point, from among the at least one access point identified in step (e), having the highest uplink signal quality.

10. Apparatus for associating a station to one of a plurality of access points in a wireless local area network (WLAN), the apparatus comprising:
   a detector adapted to measure a downlink signal quality of a message received in a signal from each of one or more access points;
   a transmitter adapted to transmit a test link request to each of the one or more access points;
   a receiver adapted to receive a corresponding test link response for each of one or more of the test link requests, the corresponding test link response including an uplink signal quality to the corresponding access point; and a comparator adapted to:
(i) identify at least one access point having a downlink signal quality above a predetermined threshold; and
(ii) identify the access point, from among the at least one access point identified in step (i), having the highest uplink signal quality;
wherein the apparatus is adapted to associate to the access point identified in step (ii) as having the highest uplink signal quality.

11. The invention as recited in claim 10, wherein the transmitter is adapted to transmit, when in an active mode, a probe request, and the message in the signal from each of the one or more access points is a probe response.

12. The invention as recited in claim 10, wherein the detector is adapted to detect, when in a passive mode, a beacon, and the message in the signal from each of the one or more access points is the beacon.

13. The invention as recited in claim 10, wherein each message conforms to a MAC layer frame format in accordance with one or more editions of an Institute of Electrical Engineers (IEEE) 802.11 standard for telecommunications and information exchange between systems.

14. The invention as recited in claim 13, wherein each link test request and the corresponding link test response conform to the MAC layer frame format in accordance with one or more editions of the IEEE 802.11 standard.

15. The invention as recited in claim 10, wherein the uplink signal quality and the downlink signal quality are indicated by one or more of a signal-to-noise ratio (SNR), a bit-error rate (BER), a power level, and a burst error rate.

16. The invention as recited in claim 10, wherein the apparatus is embodied in a processor of an integrated circuit.

17. The invention as recited in claim 10, wherein the apparatus is embodied in the station operating in accordance with one or more editions of an Institute of Electrical Engineers (IEEE) 802.11 standard for telecommunications and information exchange between systems.

18. Apparatus for associating a station to one of a plurality of access points in a wireless local area network (WLAN), the apparatus comprising:
a transmitter adapted to transmit a test link request to each of one or more access points;
a receiver adapted to receive a corresponding test link response for each of one or more of the test link requests, the corresponding test link response including an uplink signal quality to the corresponding access point;
a detector adapted to measure a downlink signal quality of the corresponding access point for each corresponding test link response; and
a comparator adapted to:
(i) identify at least one access point having a downlink signal quality above a predetermined threshold; and
(ii) identify the access point, from among the at least one access point identified in step (i), having the highest uplink signal quality;
wherein the apparatus is adapted to associate to the access point identified in step (ii) as having the highest uplink signal quality.

* * * * *